Oct. 5, 1971  S. J. HOFF  3,610,062
AUTOMATIC MINI-BIKE TRANSMISSION

Filed Dec. 3, 1969  2 Sheets-Sheet 1

INVENTOR.
STEPHEN J. HOFF
BY
Trask, Jenkins & Hanley
ATTORNEYS

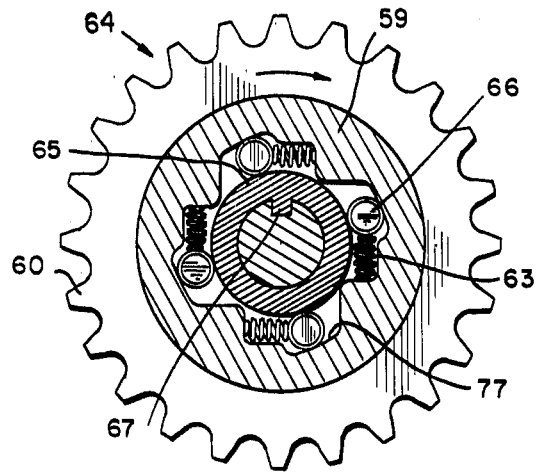
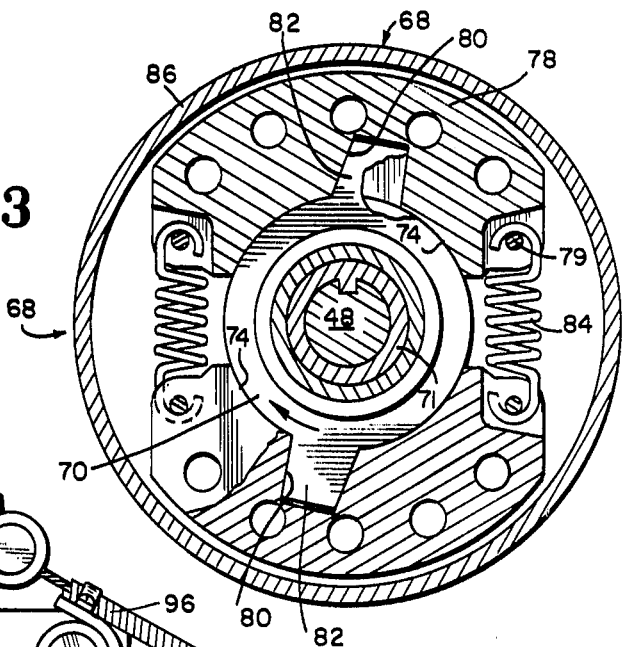
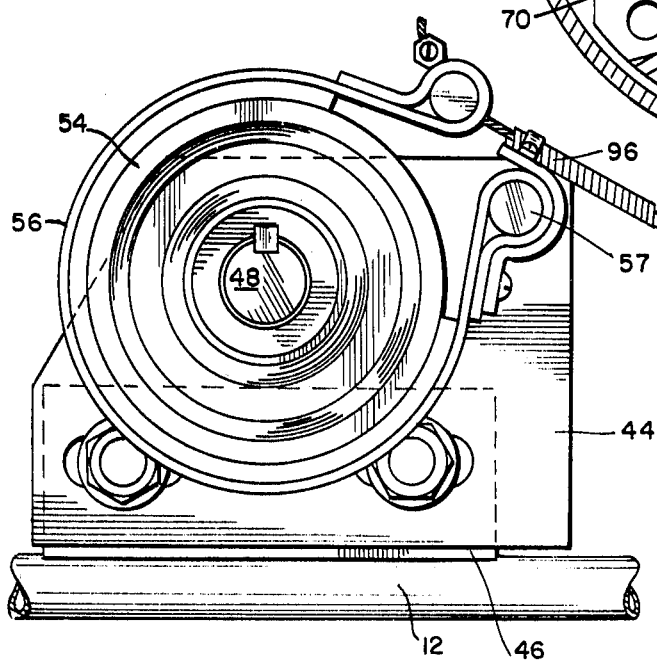

United States Patent Office 3,610,062
Patented Oct. 5, 1971

3,610,062
AUTOMATIC MINI-BIKE TRANSMISSION
Stephen J. Hoff, Richmond, Ind., assignor to Comet Industries, a division of Hoffco, Inc., Richmond, Ind.
Filed Dec. 3, 1969, Ser. No. 881,665
Int. Cl. F16d *23/10;* F16h *9/00*
U.S. Cl. 74—217 C                                                     3 Claims

ABSTRACT OF THE DISCLOSURE

An automatic two-speed transmission for mini-bikes and other light-weight vehicles. A first centrifugal main clutch on the engine shaft drives parallel chains to high- and low-speed sprockets on a jack shaft which is chain-connected to the drive-wheel. The low-speed sprocket drives the jack shaft through a one-way, roller "low" clutch of sturdy 4-roller construction, which allows the jack shaft to overrun when the high drive engages. The high-speed sprocket drives the clutch shoes of a second centrifugal "high" clutch which has its clutch drum fixed to the jack shaft. The high-clutch shoes are primarily centrifugally responsive, but are arranged to have limited self-energizing action and thereby to maintain smooth engagement and release as transition changes occur during shifts. The combination gives reliably predictable shifts in response to driver control of engine speed, and smooth transitions between low drive and high drive.

The jack shaft assembly comprises a continuously slotted shaft on which the clutches, sprockets, a brake drum, and supporting bearings are mounted in axially adjustable relation to adapt such assembly for versatile application to different bike structures and for use as a modification kit on existing bikes.

BACKGROUND OF THE INVENTION

This invention relates to an automatic transmission and more particularly to an automatic two-speed transmission for use in light weight vehicles such as "mini-bikes."

Mini-bikes in their simplest form comprise an internal combustion engine which is connected through a centrifugal main clutch to a drive train to the rear wheel, which train may include a jack shaft. The present invention utilizes a jack shaft continuously connected by a drive chain to the rear drive wheel. The engine-driven centrifugal main clutch drives high-speed and low-speed drive sprockets connected by chains at different speed ratios to high-speed and low-speed driven sprockets on the jack shaft. The low-speed driven sprocket is connected to the jack shaft through a roller clutch of sturdy 4-roller construction which allows the jack shaft to overrun the low-speed drive train when the high speed drive train is operative. The high-speed driven sprocket is connected to the shoe assembly of a secondary or high-speed centrifugal clutch, and the drum of that clutch is fixed on the jack shaft to drive such jack shaft when the high speed clutch is engaged. A brake is desirably provided on the jack shaft.

Two-speed automatic transmissions for use in mini-bikes and similar light weight vehicles have previously been proposed. The present invention relates to the type of transmission shown in U.S. Pats. Nos. 2,463,100 and 3,436,977, and constitutes an improved transmission of that general type. The transmission in accordance with the present invention has smoother and more predictable and reliable operating characteristics, especially in shifting between low and high speeds, which increases safety and gives a smoother ride and a much longer operating life.

Pat. No. 3,436,977 employs a roller clutch having a plurality of small rollers. I have found that improved results are obtained with a 4-roller clutch in which the rollers are each positively spring pressed to clutching position and operate between sturdy and solid races. Pat. 3,436,977 employs a centrifugal clutch in the high-speed drive train which has sprag-type clutch shoes mounted on the counter shaft, that is, on the element which is *driven* by the clutch, and has its drum fixed to the high-speed sprocket, that is, to the element which *drives* the clutch. This is the rational arrangement in that the centrifugally responsive clutch shoes rotate with the jack shaft and the driven wheel which undergo a continuous speed increase in the transition from low-speed drive to high-speed drive. This arrangement, as taught by the aforesaid patents, utilizes clutch shoes which are each connected to its supporting hub at a point displaced by a large angle from the center of pressure of the shoe face in a direction such that the said center of pressure is ahead of the point of support in the direction of drive rotation, which gives a high degree of self-energization in the clutch action. It has been found that such arrangement as taught by the aforesaid prior patents, gives a harsh clutching action and especially a clutching action which is unpredictable so that the bike rider cannot know or control when shifts will occur between high and low drive, especially when the bike is being ridden over rough terrain, when control is especially needed for safety.

The present invention overcomes this unpredictability and lack of control. In the present invention the mounting arrangement of the shoes and drum is reversed from that just described and a differently-acting clutch is used. The counter shaft fixedly carries the clutch drum, that is, the *driven* element of the clutch, and the shoes are carried with the high speed sprocket so that they rotate with the engine, which is the *driving* element and which tends to undergo a speed reduction in the transition from low-speed drive to high-speed drive. The shoes are mounted on the hub of the sprocket in a manner such that each shoe is driven at a point near to or ahead of the center of pressure of its clutch face. This provides a limited amount of self-energization or wedging action between the shoe and drum and the clutch engagement depends on and is responsive to a combination of both centrifugal action and self energization. The engagement is primarily centrifugal, in response to a high speed at which the shoes are driven by the engine. As they engage, their speed tends to decrease and the limited self energization maintains engagement in a smooth relationship through the transition from low speed drive to high speed drive. The result is a progressive clutch action, both on engagement and disengagement; and this combines with the action of the sturdy roller clutch to give improved and controllable operating characteristics.

BRIEF DESCRIPTION OF THE DRAWINGS

The invention is illustrated in the accompanying drawings, which show a preferred embodiment, and in which:

FIG. 2 is a sectional view of the low speed driven sprocket and roller clutch, taken on the line 2—2 of FIG. 1;

FIG. 3 is a sectional view of the centrifugal driven clutch, taken on the line 3—3 of FIG. 1; and FIG. 4 is an end view of the jack-shaft assembly, showing the brake and the mounting bracket.

DESCRIPTION OF THE PREFERRED EMBODIMENT

Figure 1:
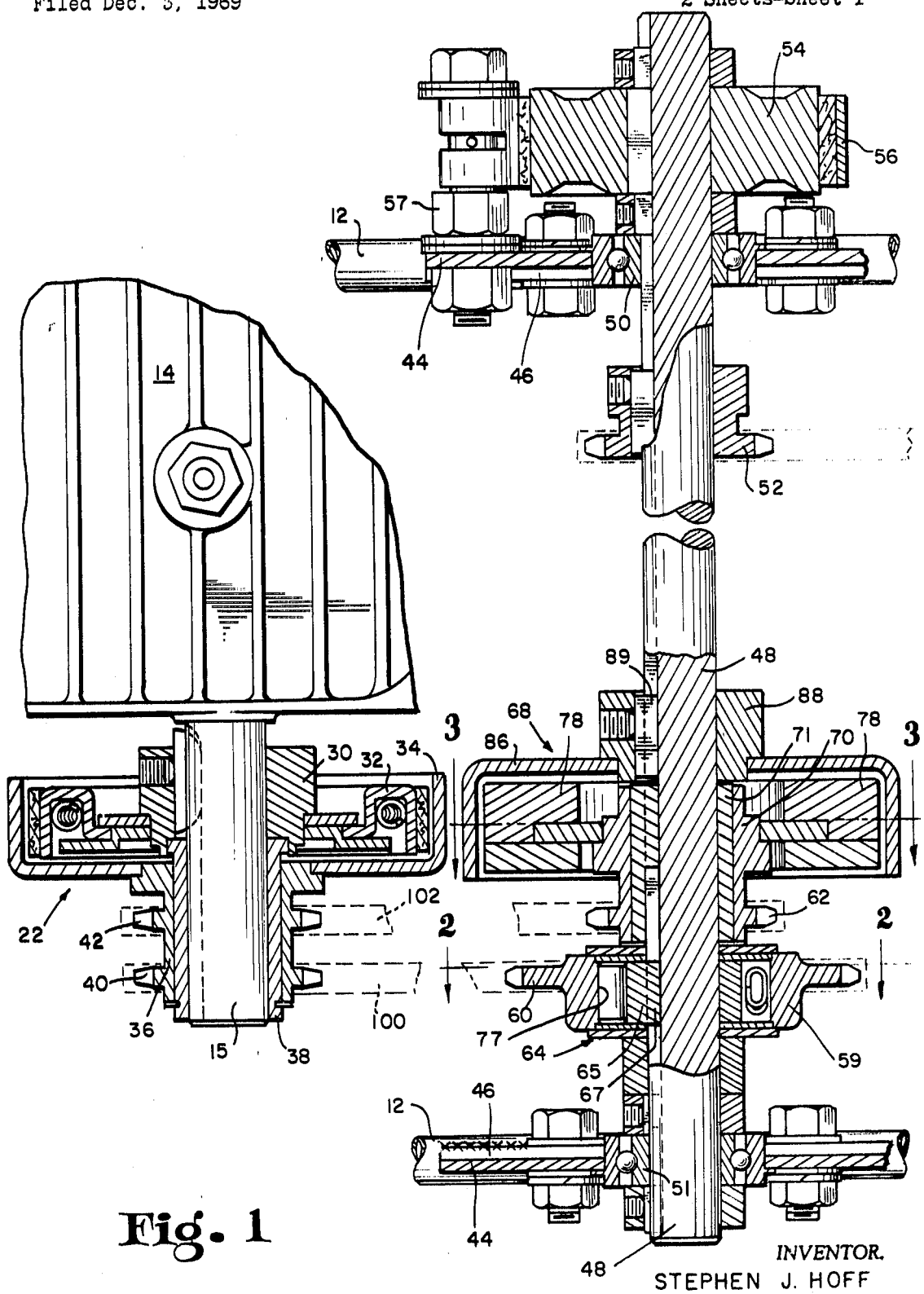
FIG. 1 is a plan view of a two-speed automatic transmission assembly in accordance with the invention, partially in section and with portions broken away.

In the mini-bike drive assembly shown in FIG. 1, the gasoline engine 14 of a mini-bike is supported by conventional means on the frame 12 of the bike. The engine shaft 15 carries the hub 30 of a centrifugal main clutch 22 having drive shoes 32 which are normally disengaged but which under centrifugal force move outward into engagement with a driven clutch drum 34, in known manner. Such drum 34 is carried by a sprocket hub 36 rotatable on a bearing sleeve 38 carried by the motor shaft 15 and fixed to the hub 30. The sprocket hub 36 carries a fixed low-speed sprocket 40 and a fixed high speed sprocket 42, which are conveniently of the same size as shown and may have, for example, twelve sprocket teeth.

A counter shaft or jack shaft 48 is mounted on frame members 12 by means of ball bearings 50 and 51. The inner races of the bearings carry the jack shaft, while the outer races are fixed in mounting plates 44 which are adjustable on and bolted to mounting brackets 46 welded or otherwise secured to members of the bike frame 12. The jack-shaft 48 is a continuous length of slotted shaft and the bearings and other elements are adjustably mounted thereon and secured by collars and set screws so that the assembly is readily adapted to fit various bike assemblies and to be supplied as a kit for application to existing bikes.

The jack shaft assembly includes a final drive sprocket 52 which in use is connected by a chain to a sprocket on the drive wheel of the mini-bike. Outward from such sprocket and adjacent the outer face of bearing 50, the jack shaft also carries a brake drum 54 arranged to be engaged by a brake band 56 carried by a mounting stud 57 on the mounting plate 44 for the adjacent bearing 50.

A low-speed driven sprocket 60 and a high speed driven sprocket 62 are mounted on the other end of the jack shaft 48, inside the bearing 51 in alignment with the high and low speed sprockets 40 and 42 carried by the motor shaft 15. When the parts described above are mounted for use, the low speed sprockets 40 and 60 are connected by a low-speed chain 100, and the high speed sprockets 42 and 62 are connected by a high-speed chain 102.

The low speed sprocket 60 is carried by the outer ring 59 of a roller clutch 64 having a hub 65 keyed to the jack shaft 48, as indicated at 67. As shown in FIG. 2, clutch 64 has four roller bearings 66 spaced 90° apart and each positioned between a ramp on the heavy ring 59 and the hub 65. Each roller 66 has an associated spring 63 pressing it into a position of clutching engagement between its ramp and the hub 65. The clutch is arranged to transmit drive from the sprocket 60 to the jack shaft during low-speed drive but to permit the hub 65 and jack shaft 48 to overrun the low speed driven sprocket 60 when the jack shaft is driven at a higher speed by the high speed sprocket 62.

The high speed sprocket 62 is arranged to transmit drive to the jack shaft 48 by means of a centrifugal clutch 68, the characteristics and arrangement of which are of prime importance to the two-speed operation. The clutch 68 includes a hub 70 which carries the sprocket 62 and is mounted for rotation on a bearing sleeve 71 carried by the jack shaft 48. As best seen in FIG. 3, each shoe 78 has an inner face 74 which normally bears against the peripheral surface of the hub 70, and each shoe is provided with a radially extending socket 80 which receives a driving lug 82 fixed on the hub 70. Preferably, the driving lugs 82 and sockets 80 are positioned at the center, circumferentially, of the shoes, and hence at the centers of pressure of the clutch faces, or slightly forward of such centers in the direction of rotation.

The ends of the shoes 78 carry cross pins 79, between which tension springs 84 are connected to bias the two shoes 78 inward to a retracted or disengaged position. Under centrifugal force, the shoes 78 move outward into engagement with the drum 86. The lugs 82 and sockets 80 remain in engagement in all operative positions of the shoes 78 relative to the hub 70. The clutch drum 86 is fixed to a hub 88 which is keyed to the jack shaft 48 by a key 89, so as to be mounted coaxially with and engageable by the shoes 78.

With the engine 14 idling and the engine shaft 15 rotating at idling speed (e.g., up to 1000 r.p.m.), the shoes 32 of the centrifugal main clutch 22 will be retracted and no drive will be transmited from the engine to the clutch drum 34 and drive sprockets 40 and 42. When the engine is accelerated to the engaging speed for which the main clutch 22 is designed, for example 1900 r.p.m., the clutch shoes 32 are thrown outward by centrifugal force to engage the drum 34 and drive it and the two sprockets 40 and 42. The high-speed centrifugal clutch 68 will be in disengaged condition below its designed engaging speed, and drive will be through the low-speed sprocket 40, the low-speed chain 100, the low-speed driven sprocket 60, and the low-speed clutch 64. In such clutch, the rollers 66 are spring-pressed into one-way (forward) clutching engagement between the ring 59 and the hub 65, and rotation of sprocket 60 will therefore transmit driving torque to the jack shaft 48. The jack shaft 48 will rotate the drive sprocket 52 to transmit drive to the drive wheel at the low speed ratio determined by the relative sizes of the low speed sprockets 40 and 60. As here illustrated, the sprockets 40 and 60 have 12 and 24 teeth respectively, and the sprocket 60 rotates at one-half the speed of the sprocket 40.

The bike is accelerated in the low speed drive until the high-speed clutch reaches its predetermined engagement speed, for example, a speed of 2700 r.p.m. for the hub 70 and its sprocket 62. As shown, such sprocket has the same number of teeth (12) as the driving sprocket 60, so that the hub 70 is rotated at engine speed. At the engagement speed of the high speed centrifugal clutch 68, its shoes 78 will engage its drum 86 to engage high-speed drive. When full engagement is reached, the high speed sprocket 62 will drive the jack shaft at engine speed, at a high-speed drive ratio of 1:1. When the high speed drive rotates the jack shaft at any speed higher than the low-speed clutch 64, the rollers 66 of such low speed clutch will allow the hub 65 to freely overrun the low-speed sprocket 60.

In the transition from low to high speed, the shoes 78 first move under centrifugal force into initial engagement with the drum 86, which will be rotating, under low-speed drive, at half the speed of the shoes 78. Engagement will tend to increase the speed of the drum and reduce the rotational speed of the engine and shoes, and hence will tend to reduce the centrifugal force tending to cause engagement. But the limited or "soft" self-energizing action of the shoes will maintain the engagement and progressively increase it. A smooth transition to full engagement will occur, to fully establish high speed drive. Shifts between the 2:1 low drive and the 1:1 high drive will be responsive to engine speed, which the driver controls, rather than to jack shaft speed which may vary with changes in the surface on which the bike is being driven and on traction engagement between the drive wheel and the ground.

When engine speed decreases below the predetermined engagement speed the reduction of the centrifugal force on the shoes 78 or the high speed clutch 68 causes such shoes to disengage from clutch drum 86, thus disengaging the high speed drive. Overrunning of the low speed clutch will then cease and driving torque will then again be transmitted to the jack shaft 48 by such low speed clutch 64. Again, in this shift from high to low drive the limited self energizing action of the high-speed clutch shoes will ensure a smooth transition in the shift.

Efficient braking action will be provided by engagement of the brake band 56 about the brake drum 54 fixed on the jack shaft 48 and hence rotating at jack shaft speed rather than wheel speed. The brake is actuated in conventional manner, by means of a manual brake control (not shown) acting through the control cable 96.

The automatic transmission according to the invention is adapted to be utilized either as original equipment on a mini-bike as manufactured, or as a kit for application to existing mini-bikes. Such a kit may include all of the parts shown in FIG. 1, except only for the engine 14 and its shaft 15, and the two frame members 12. The kit may include the two mounting brackets 44 which may be welded in place when the kit is installed, and which will then support the mounting plates 46 for adjustment to suit appropriate chain lengths to the drive wheel and from the sprockets 40 and 42 when mounted on the engine shaft. The several parts on the jack shaft are all adjustably mounted thereon to suit the positions of the mounting brackets, the engine, and the rear wheel.

I claim:

1. An automatic two-speed transmission for mini-bikes and the like having an engine shaft and a drive wheel or the like, comprising a main clutch, high-speed and low-speed drive sprockets adapted to be clutched to said engine shaft by said main clutch to be driven thereby, high-speed and low-speed driven sprockets coaxial with a jack shaft for transmitting drive to the drive wheel, means to connect said driven sprockets respectively to said drive sprockets to provide high-speed and low-speed drive trains, one of said low-speed sprockets being connected in its drive train by a one-way roller clutch arranged to transmit drive in the low-speed drive train and to overrun when the high-speed drive train is engaged, and said high-speed driven sprocket being connected to the jack shaft by a normally-disengaged high-speed centrifugal clutch, said centrifugal clutch comprising a pair of centrifugally responsive clutch shoes, a driving hub for said shoes driven by said driven sprocket, and a clutch drum mounted for driving said jack shaft and engageable by said shoes, each shoe having a drive socket therein and the hub having drive lugs engaged in said sockets, the drive engagement between each lug and its shoe being adjacent the circumferential center of contact pressure between the shoe face and the drum, the shoes of said centrifugal clutch being constructed and arranged to make initial engagement with the clutch drum in response to centrifugal force and to have limited self energizing action in response to such initial engagement, and thereby to maintain and progressively increase engagement to establish high speed drive, such self energizing action being limited to effect a smooth transition as said engagement occurs.

2. The invention as set forth in claim 1 in which said drive engagement is a short distance ahead of said circumferential center of contact pressure in the direction of drive rotation.

3. An automatic transmission kit for a mini-bike or the like having a frame, an engine supported thereon having a shaft, and a drive wheel, comprising high-speed and low-speed drive sprockets adapted to be mounted on and driven by the engine shaft, a jack shaft adapted to be mounted on the frame for rotation on an axis between the engine and the drive wheel, high-speed and low-speed driven sprockets adapted to be connected respectively to said drive sprockets, said low-speed driven sprocket being arranged for mounting on said jack shaft by a one-way roller clutch arranged to permit said jack shaft to overrun said driven sprocket, and said high-speed driven sprocket being arranged for mounting on said jack shaft and connected with the shoe assembly of a centrifugal clutch, said centrifugal clutch having a clutch drum arranged for mounting on said jack shaft coaxially with and engageable by said shoe assembly, said shoe assembly comprising a pair of clutch shoes, a driving hub for said shoes, each shoe having a drive socket therein and the hub having drive lugs engaged in said sockets, the drive engagement between each lug and its shoe being adjacent the circumferential center of contact pressure between the shoe face and the drum, the shoes of the high-speed centrifugal clutch being constructed and arranged to make initial engagement with their clutch drum in response to centrifugal force and to have limited self energizing action in response to such initial engagement, and thereby to maintain and progressively increase engagement to establish high speed drive, such self energizing action being limited to effect a smooth transition as said engagement occurs.

References Cited

UNITED STATES PATENTS

| | | | |
|---|---|---|---|
| 2,488,892 | 11/1949 | Arzt | 74—217 (B) X |
| 3,247,727 | 4/1966 | Digby et al. | 192—45 X |
| 3,436,977 | 4/1969 | Gredell | 74—217 (C) |
| 3,461,994 | 8/1969 | Dallman et al. | 192—105 (BA) |

LEONARD HALL GERIN, Primary Examiner

U.S. Cl. X.R.

74—217 (S); 192—105 (CD)